US 6,491,259 B1
(12) United States Patent
Kirn et al.
(10) Patent No.: US 6,491,259 B1
(45) Date of Patent: *Dec. 10, 2002

(54) HALOGENATED COMPOSITES FOR OXYGEN SYSTEMS

(75) Inventors: Elizabeth P. Kirn, Fort Worth, TX (US); Neil Anthony Graf, River Ridge, LA (US); Kevin Wilbur Ely, Huntsville, AL (US)

(73) Assignee: Lockheed Martin Corporation, New Orleans, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,804

(22) Filed: May 11, 1999

Related U.S. Application Data
(60) Provisional application No. 60/084,986, filed on May 11, 1998, provisional application No. 60/084,987, filed on May 11, 1998, provisional application No. 60/084,988, filed on May 11, 1998, provisional application No. 60/084,989, filed on May 11, 1998, provisional application No. 60/084,990, filed on May 11, 1998, provisional application No. 60/084,991, filed on May 11, 1998, and provisional application No. 60/084,992, filed on May 11, 1998.

(51) Int. Cl.[7] ................................................ B64G 1/22
(52) U.S. Cl. .................... 244/172; 244/158 R; 62/45.1; 220/560.07
(58) Field of Search ............................. 744/158 R, 172, 744/53 R; 62/45.1; 220/454, 560.07, 456, 560.04

(56) References Cited

U.S. PATENT DOCUMENTS

| | | | |
|---|---|---|---|
| 3,655,086 A | * | 4/1972 | Trenner |
| 3,955,784 A | * | 5/1976 | Salkeld |
| 4,366,917 A | * | 1/1983 | Kotcharian |
| 4,817,890 A | * | 4/1989 | Coffinberry |
| 4,904,760 A | * | 2/1990 | Gaku et al. |
| 4,959,481 A | * | 9/1990 | Axelrod et al. |
| 5,027,597 A | * | 7/1991 | Soeffker et al. |
| 5,150,812 A | * | 9/1992 | Adams |
| 5,357,026 A | * | 10/1994 | Younes |
| 5,380,768 A | | 1/1995 | Cranston et al. ............. 521/167 |
| 5,383,994 A | * | 1/1995 | Shea |
| 5,403,537 A | | 4/1995 | Seal et al. ................... 264/511 |
| 5,419,139 A | | 5/1995 | Blum et al. ................... 62/45.1 |
| 5,865,923 A | * | 2/1999 | Johnson |
| 6,013,752 A | * | 1/2000 | Mowrer et al. |
| 6,158,605 A | * | 12/2000 | Delay |

FOREIGN PATENT DOCUMENTS

| WO | WO97/28401 | 8/1997 |
|---|---|---|
| WO | WO97/18081 | 5/1998 |

* cited by examiner

*Primary Examiner*—Charles T. Jordan
*Assistant Examiner*—T. Dinh
(74) *Attorney, Agent, or Firm*—Garvey, Smith, Nehrbass & Doody, L.L.C.; Charles C. Garvey, Jr.; Seth M. Nehrbass

(57) ABSTRACT

The development of polymer composite liquid oxygen (LOX) tanks is a critical step in creating the next generation of launch vehicles. A composite LOX tank will weigh significantly less than conventional metal tanks. This benefit of reduced weight is critical to enable future launch vehicles to meet required mass fractions. The high strength and low weight of a composite tank allows for a lighter weight craft and/or higher payload capacity which results in lower costs per pound to place an object in orbit. The unique, nontraditional idea described here is to use resin-based composite materials to make such a composite tank or other oxygen carrying component such as a feedline. Polymer composites have traditionally been regarded as being more flammable than metals and therefore deemed not oxygen compatible. However, several halogenated composites have been tested for their ability to withstand ignition in the presence of oxygen, and have shown to be resistant to ignition. A halogenated composite material is a fiber reinforced composite that contains an element or elements from column 7A in the Periodic Table of Elements.

21 Claims, 6 Drawing Sheets

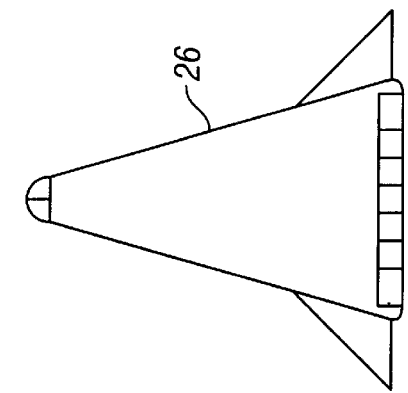
FIG. 17
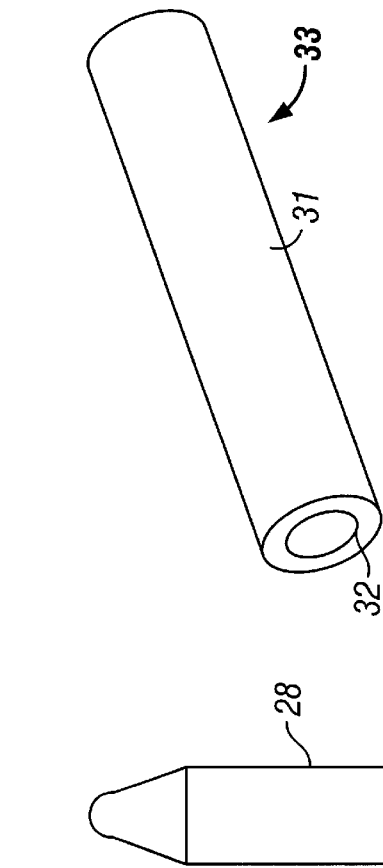
FIG. 20
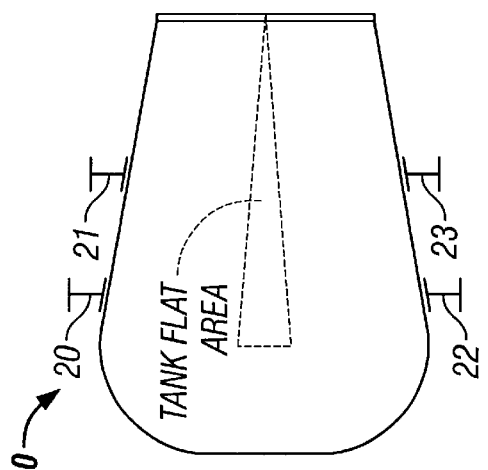
FIG. 16
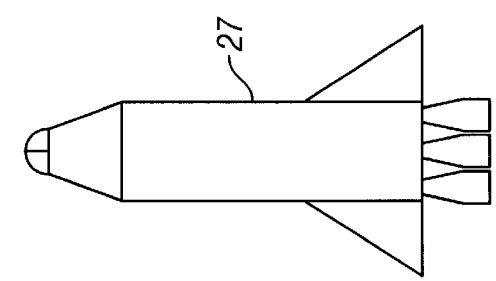
FIG. 19
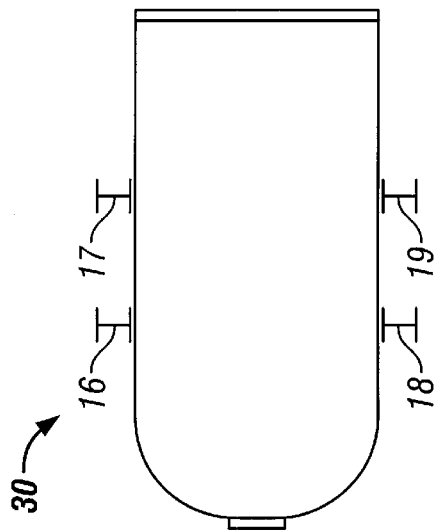
FIG. 15
FIG. 18

HALOGENATED COMPOSITES FOR OXYGEN SYSTEMS

CROSS-REFERENCE TO RELATED APPLICATIONS

U.S. Provisional Patent Application Ser. Nos. 60/084,986; 60/084,987; 60/084,988; 60/084,989; 60/084,990; 60/084,991; 60/084,992; all filed May 11, 1998, are incorporated herein by reference; priority of these applications is hereby claimed.

STATEMENT REGARDING FEDERALLY SPONSORED RESEARCH OR DEVELOPMENT

The inventions described herein were made in the performance of work under Lockheed Martin Michoud Space Systems IRAD M-21D and under Cooperative Agreement No. NCC8-115 dated Jul. 1, 1996.

REFERENCE TO A "MICROFICHE APPENDIX"

Not applicable

BACKGROUND OF THE INVENTION

1. Field of the Invention

This invention relates in general to liquid oxygen tanks and feedline system of a composite material construction and more specifically to resins containing halogen elements or laminates subjected to halogenated treatments, either of which may be suitable for use as an oxygen tank or feedline system.

2. General Background

The development of polymer composite liquid oxygen tanks is a critical step in creating the next generation of launch vehicles. Future reusable launch vehicles need to minimize the gross liftoff weight (GLOW) by reducing the dry mass fraction. The (dry) mass fraction is the weight of the launch vehicle without fuel divided by the weight of the vehicle with fuel. FIG. 1 is graph showing the effect of mass fraction on GLOW. Indicated on the graph are the RLV mass fraction target region as well as the mass fraction of the RLV without the weight reduction that composites could provide. It is clear that the benefit of composites tanks are critical to enable future launch vehicles to meet required mass fractions.

The required mass fraction is possible due to the reduction of weight that composite materials can provide. Traditional oxygen tanks are usually made from metals. The space shuttle external tank (ET) has historically been made from 2219 aluminum and more recently 2195 aluminum/lithium alloy. FIG. 2 shows a comparison between these two aluminum alloys and a typical composite material for a liquid oxygen tank for a launch vehicle. The chart shows that a composite tank provides up to 41% and 28% weight savings when compared to 2219 and 2195 aluminum tanks, respectively.

In addition to meeting the required mass fraction, a liquid oxygen tank must be compatible with oxygen. The ASTM definition for oxygen compatibility is the "ability of a substance to coexist with both oxygen and a potential source(s) of ignition within the acceptable risk parameter of the user." It is imperative that materials are selected that will resist any type of detrimental, combustible reaction when exposed to usage environments. Typically, non-metallic materials are not used in these applications because most are easily ignited in the presence of oxygen. However, there are some polymeric materials with inert chemistries that may be used for this application and resist ignition. These chemistries were evaluated by fabricating coupons and testing them with various ignition mechanisms in the presence of liquid and gaseous oxygen. The testing performed reflected situations in launch vehicles that could be potential sources of ignition in composite. These tests included pressurized mechanical impact, particle impact, puncture, puncture of damaged, oxygen-soaked samples, electrostatic discharge, friction, and pyrotechnic shock. An example of a polymeric material system that resisted reaction to these mechanisms were halogenated composites.

Applications include liquid oxygen for future launch vehicles, such as the Lockheed Martin Reusable Launch Vehicle (RLV). They could also potentially be used in other aerospace applications, including but not limited to, RFP (rocket fuel propellant) tanks and crew vehicle cabins. Other industries that may be interested in composite oxygen tanks include the air handling and medical industries. The ability to resist ignition may also be useful in chemical storage tanks and NGV (natural gas vehicle) tanks.

The following U.S. Patents are incorporated herein by reference: U.S. Pat. Nos. 5,056,367; 5,251,487; 5,380,768; 5,403,537; 5,419,139; and all references cited in those patents.

The following international applications published under the PCT are incorporated herein by reference: International Publication Nos. WO 97/18081 and WO 97/28401 and all references cited in those publications.

SUMMARY OF INVENTION

A fiber-reinforced composite is defined as a material consisting of fibers of high strength and modulus embedded in or bonded to a matrix with distinct interfaces or boundaries between them. In this form, both fibers and matrix retain their physical and chemical identities, yet they produce a combination of properties that cannot be produced by either constituent alone. In general, fibers are the principal load carrying members, while the surrounding matrix keeps them in desired location and orientation, transfers loads between fibers, and protects the fibers. The matrix material may be a polymer, a metal, or a ceramic. This patent focuses on polymer matrix composites.

The fibers can be made from a variety of materials. These materials include glass, graphite or carbon, polymers, boron, ceramics, or metals. Glass fibers include E-glass (electrical) and S-glass (structural) types. Carbon fibers include those made from different precursors,. such as polyacrylonitrile (PAN) or pitch. Polymer fibers include, but are not limited to, aramid (Kevlar®), polyethylene (Spectra®, or PBO (Zylon®). Ceramic fibers may include silicon carbide (SiC) or aluminum oxide (Al203).

For cryogenic tanks, the preferred matrix material is a polymer. The preferred fiber is carbon fiber, more preferably PAN-based fibers, more preferably high strength (over 500 ksi) and high modulus (over 30 Msi) fibers. The most preferred fibers are ultra high modulus fibers (over 60 Msi), specifically M55J fiber by Toray.

Another critical parameter for a composite tank is the ability to withstand repeated temperature changes (thermal cycles) without microcracking. One factor that contributes to microcrack resistance is toughness.

The unique, nontraditional concept explored herein is to use halogenated fiber-reinforced composites to create liquid oxygen tanks. A halogenated material is one which contains one or more elements from the halogen family (column 7A in the Periodic Table of Elements) in its chemical structure. Halogens of particular interest include bromine, chlorine, and fluorine. These elements form chemically stable bonds which enhances a material's ability to be flame resistant and compatible with oxygen and other reactive fuels. A composite material may be halogenated by incorporating halogens various stages of the fabrication process including the neat resin formulation, prepreg processing, and/or cure. A more complete definition of these processes in described in the section titled "Detailed Description".

Several halogenated resins and composites have been subjected to an extensive battery of tests for their sensitivity to reaction in the presence of oxygen. Historically, the approach was to test the material in the standard mechanical impact test in liquid oxygen (LOX). If the material had an impact threshold of 72 foot-pounds, it was acceptable for use in oxygen environments, such as launch vehicle LOX tanks. If the material's threshold was less than 72 foot-pounds, it typically was not used. Due to limitations in the testing as well as differences in the material structures between metals and composites, standard high strength composite materials typically have not been able to pass at this level when tested at RLV tank wall thicknesses. The approach taken here, which was developed in conjunction with NASA, was to use the standard mechanical impact test to rank composites with respect to each other. Furthermore, an evaluation of the compatibility of composites in oxygen environments would only be determined after testing composite materials with respect to specific ignition mechanisms while in the presence of oxygen. The ignition mechanisms tested included pressurized mechanical impact, particle impact, puncture, puncture of damaged, oxygen-soaked samples, electrostatic discharge, friction, and pyrotechnic shock. If the material could withstand ignition in these environments, it could possibly be considered oxygen compatible.

Halogenated materials which have been evaluated in the standard mechanical impact test include brominated epoxy resin and composite systems as well as a fluorinated resin and composite system. In addition to these candidates, which contained halogens incorporated into the chemical structure of the resin before composite fabrication, a halogenation treatment was applied to already-cured composites and uncured preimpregnated fibers. Specifically, a graphite/epoxy system was treated in a fluorine gas chamber in both uncured prepreg and cured composite states. Many of these halogenated materials were tested in both neat resin and fiber-reinforced composite forms. FIG. 3 shows selected results for neat resins while FIG. 4 shows selected composite materials. Clearly, the halogenated materials out performed the epoxy material.

One halogenated material was also tested in each of the ignition mechanisms listed above. In each case, the materials did not react. In addition, this material was tested in a Promoted Combustion test. In this test, the composite material was deliberately ignited using a special igniter material. The time it took to completely burn in a 100% oxygen atmosphere was then measured. FIG. 5 shows the average complete burn times for 10 samples compared with the average of 10 samples of the leading epoxy candidate. This test indicated the halogenated material took significantly longer than the standard epoxy to burn, indicating another level of safety over conventional composite materials. It is believed that other halogenated materials would behave similarly.

The apparatus of the present invention solves the problems confronted in the art in a simple and straightforward manner. What is provided are composite tanks for liquid oxygen.

The composite tanks can be made in accordance with any of the methods disclosed in any reference incorporated herein by reference. The invention could be made, for example, using the method of U.S. Pat. No. 5,403,537.

The interior of the tanks disclosed herein typically have a volume of at least 1 liter, more often at least one gallon, and usually have a volume sufficient to allow their use to contain liquid oxygen for typical aerospace applications.

A mechanical impact of at least 10+ ft-lbs at around −300 degrees F. (at around −350 degrees F. when densified oxygen (slush oxygen) is contained in the tank) is preferred, but is not a requirement. Historically materials have been required to pass the Lox mechanical impact test at 72 ft-lbs or otherwise be shown to be safe for use in application. Lox compatible composite materials have demonstrated the ability to resist combustion when subjected to any potential ignition source. For a composite tank, realistic potential ignition sources were determined to include, but are not limited to mechanisms such as pyrotechnic shock, friction, puncture, electrostatic discharge, and particle impact. These tests are taken to extreme levels. For example, in the puncture test, a sharpened serrated spike pierced a composite material while submerged in Lox without igniting the composite. This same puncture test has ignited Titanium, a material that is not oxygen compatible, and does not ignite aluminum. The pyrotechnic shock test was also an extreme test in that composites were placed in Lox and subjected to shock loads equivalent to existing metallic Lox tanks such as that on the External Tank. The friction test was extreme in that the composites were abraded to dust with a drill bit in pure oxygen without ignition. In the electrostatic discharge test, composites were subjected to energies that. could far exceed any instrumentation or static build up; specifically, these composites do not ignite when subjected to 112.5 Joules from 5000 Volts.

The composite feedline of the present invention preferably has an inner diameter of around 1" to 36".

As used herein, "form of fiber" means uni-directional tape, slit tape, tow, fabric, woven fabric, chopped fiber; or felt.

BRIEF DESCRIPTION OF THE SEVERAL VIEWS OF THE DRAWINGS

For a further understanding of the nature, objects, and advantages of the present invention, reference should be had to the following detailed description, read in conjunction with the drawings, wherein time is in seconds and mechanical impact is in foot-pounds.

FIG. 15 is a side view of the preferred embodiment of the apparatus of the present invention showing a semi-conformal tank, general configuration;

FIG. 16 is a plan view of the tank of FIG. 15;

FIG. 17 is a perspective of the preferred embodiment of the apparatus of the present invention showing a lifting body;

FIG. 18 is a perspective of the preferred embodiment of the apparatus of the present invention showing a winged body;

FIG. 19 is a perspective of the preferred embodiment of the apparatus of the present invention showing a cylindrical stage, external tank type; and FIG. 20 is a schematic of a feedline.

DETAILED DESCRIPTION

Figure 9:
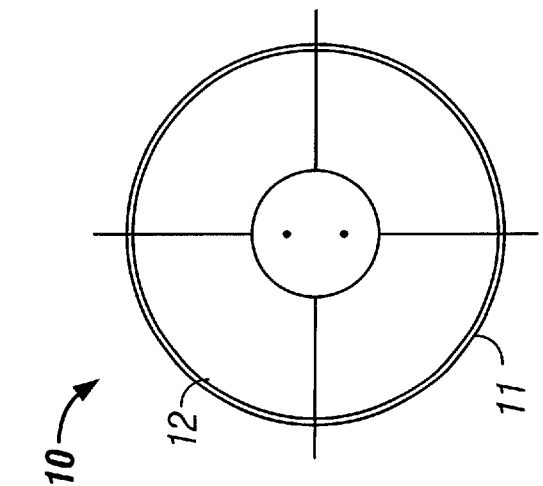
FIG. 9 is an end view of the tank of FIG. 8.
Figure 8:
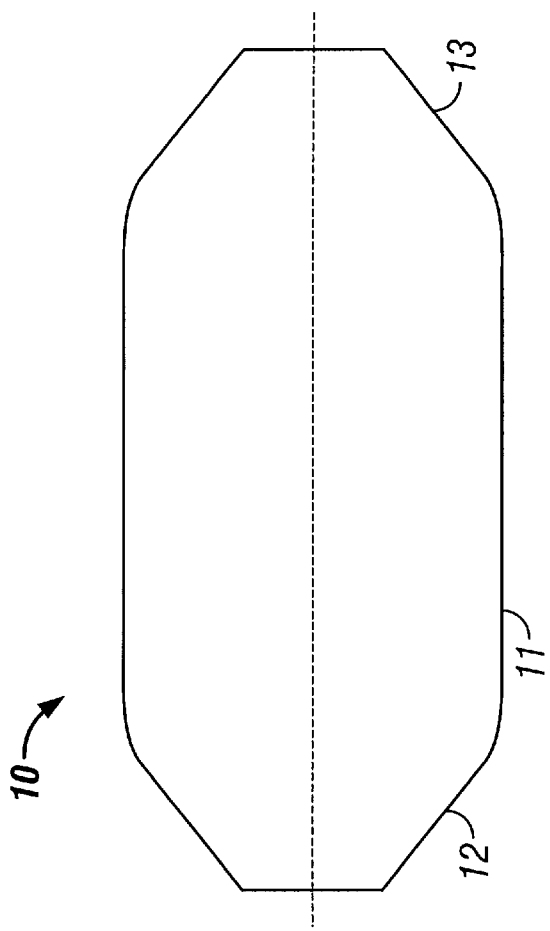
FIG. 8 is a side view of the preferred embodiment of the apparatus of the present invention shown in a cylindrical tank general configuration.

FIGS. 8–9 show the preferred embodiment of the apparatus of the present invention designated generally by the numeral 10. The shape of a composite LO2 tank is not limited to, but may be any of the following: cylindrical, spherical, ogived, multi-lobe, or conformal. Composite LO2 tanks may be part of but are not limited to any of the following launch vehicles types: lifting body or winged body. A composite tank may also be part of a separate stage such as the External tank of the spare shuttle.

Figure 10:
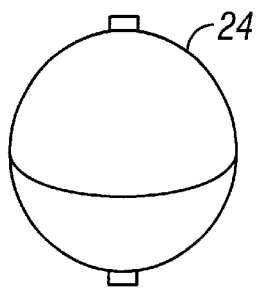
FIG. 10 is a perspective view of the preferred embodiment of the apparatus of the present invention showing a spherical tank.

A spherical tank 24 is simply a sphere as shown in FIG. 10. Tank 24 can have a diameter of between about 1–150 feet.

Figure 11:
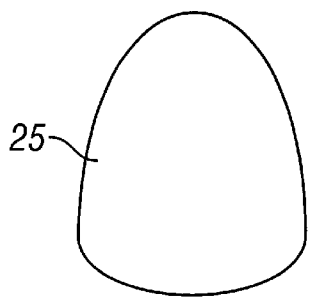
FIG. 11 is a perspective view of the preferred embodiment of the apparatus of the present invention showing an ogived tank.

An ogived tank 25 is a tank with an ogive shape along its sides. The sides can measure between about 1 and 150 feet wide or about 3 and 150 feet high. An example of an ogive tank 25 is the external Tank LO2 tank. FIG. 11 depicts a sketch of this concept.

Any of the tanks of FIGS. 8–16 may also be part of a winged body vehicle 27 or a cylindrical stage 28 as shown in FIGS. 18 and 19, respectively. Winged body vehicles 27 can be generally cylindrically shaped, with wings on the sides.

A composite LO2 may be part of a single stage to orbit vehicle or a multiple stage to orbit vehicle where a multiple stage to orbit vehicle is composed of at least 2 stages.

A cylindrical tank is one that has a basic body as a cylinder 11 as shown in FIGS. 8–9. Domes 12, 13 may be facing outward as shown in FIG. 10, but may also be internal or flat bulkheads capping off a cylinder. In FIGS. 8 and 9, a cylindrical tank 10 is shown having a general configuration that includes a cylindrically shaped side wall 11 and conically shaped dome end portions 12, 13.

Figure 12:
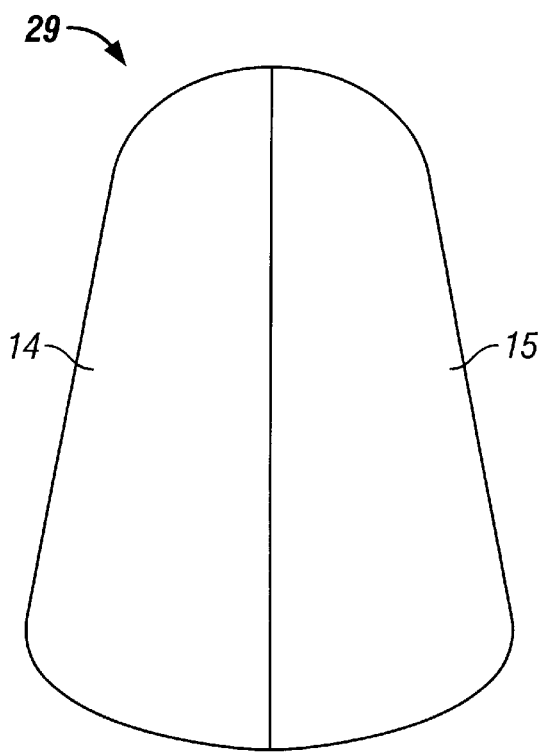
FIG. 12 is plan view of the preferred embodiment of the apparatus of the present invention showing a multi-lobe tank, general configuration.
Figure 14:
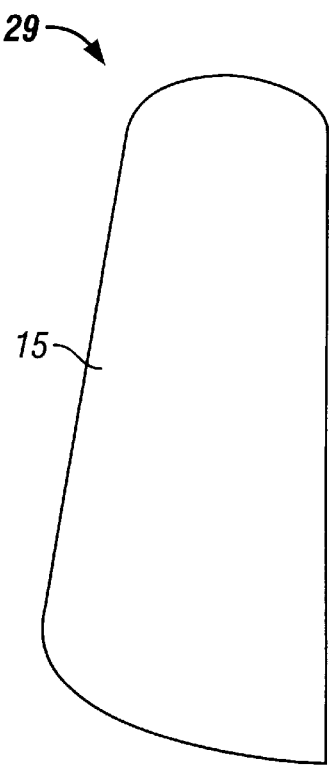
FIG. 14 is a side view of the tank of FIGS. 12 and 13.
Figure 13:
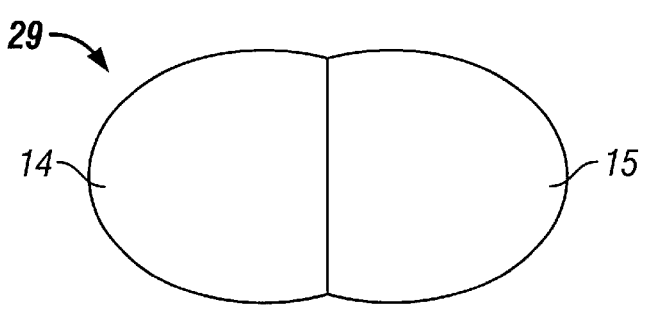
FIG. 13 is an end view of the tank of FIG. 12.

In FIGS. 12–14, the tank apparatus 10 is shown in a multi-lobe tank configuration. A multi-lobe tank 29 will have at least 2 lobes as shown in FIGS. 12–14. A multi-lobe tank may also have more than 2 lobes, but typically no more than 5 lobes. A multi-lobe Lox tank 29 may have one lobe with Lox and the other lobe or lobes may contain other propellants such as LH2. In FIGS. 12–14, two tank lobes 14, 15 are shown. However, it should be understood that though there are a minimum of two lobes in FIGS. 12–14, there may be more lobes for forming tank 10.

In FIGS. 15 and 16, a conformal tank 30 is shown mounted between beams including an upper pair of beams 16, 17 and a lower pair of beams 18, 19. Similarly, the tank 10 in FIGS. 15 and 16 can be braced with additional vertically extending beams 20–23. Each of the tanks 10, 24, 25, 29, 30 can have a length of for example 2–150 feet and a maximum transverse dimension of between 2 and 100 feet. In FIGS. 8 and 9, the cylindrically shaped tank provides a diameter of about 1–100 feet and an overall length of about 2–150 feet. The multi-lobe tank 29 of FIGS. 14–16 provides an overall length of between about 4 and 150 feet, a width of 3–100 feet and a height of 2–100 feet.

A conformal tank 30 is any tank which aims to conform or shape itself to the vehicle inner mold line. Therefore, the shape of a conformal tank 30 will depend upon the vehicle body shape. FIGS. 15–16 show an example of a conformal tank for a lifting body type launch vehicle 26. A lifting body type vehicle 26 is depicted in FIG. 17. The conformal tank 30 of FIGS. 15 and 16 provides an overall length of between about 4 and 150 feet, a width of between 3 and 100 feet, and a height of between about 2–50 feet.

MATERIAL DETAILS

A composite material can be halogenated, but is not limited to, the following or combinations of the following:

1). The first basic approach is to integrate halogen elements into the chemical structure of the resin. Halogens may be integrated into the structure of the neat resin by any of the following methods:

a). Mixing a halogenated fluid into a non-halogenated fluid in which the two liquids become one homogeneous mixture. An example of this would be the mixture of a fluid containing bromine into an otherwise conventional epoxy.

b). Mixing a halogenated fluid into a non-halogenated fluid in which the two liquids remain somewhat separate; therefore, the resulting mixture is not homogeneous.

c). Mixing halogen solids or pellets, such as Teflon (fluorine containing) microballs, into a liquid resin which results in a 2 phase mixture.

d). Mixing halogen solids or pellets, into the resin, and subsequently adding heat to the mixture and blending it into a more homogeneous liquid.

2). A second approach to halogenate a composite material is to incorporate halogens into the pre-preg process. Prepreg is defined as a material consisting of uncured resin impregnated on fibers. Halogenation of prepregs can be accomplished by any of the following methods:

a). Exposure of a prepreg to halogen gas or gaseous mixture containing halogens. Exposure may occur at typical ambient temperature and atmospheric pressure conditions or may occur at elevated temperatures and/or elevated pressures. The resulting product is halogenated prepreg. This process may take place before or after the prepreg has been placed.

b). Exposure of a prepreg to halogen particles via a charged fluidized bed. In this method, a continuous pre-preg tow or pre-preg roving, is pulled through a bed of charged halogen particles which are excited and thus adhere to grounded prepreg tow or roving. Likewise, a pre-preg fabric or uni-tape may be subjected to a bed of charged halogen particles so that the charged halogen particles become attracted to and adhere to the prepreg fabric. The resulting product is halogenated prepreg. This process would typically take place prior to placement of the prepreg material.

c). Exposure of plain fiber to halogen particles via a charged fluidized bed. In this method, a continuous fiber tow or roving, is pulled through a bed of charged halogen particles which are excited and thus adhere to grounded fiber tow or roving. Likewise, a dry fiber fabric, woven or unidirectional, may be subjected to a bed of charged halogen particles so that the charged halogen particles become attracted to and adhere to the prepreg fabric. The resulting product is halogenated prepreg.

d). Prepreging fiber with a halogenated resin in which the resin meets any of the description in 1). The method of prepreging may be, but is not limited to, hot melt or solution. An example of this is graphite impregnated with resins such as BryteÔs 1522 resins.

3). A third approach to halogenate a composite material is to incorporate halogens after the composite material has been cured. In this method, a cured composite is exposed to halogen gas or gaseous mixture containing halogens, such as fluorine. Exposure may occur at elevated temperatures and/or atmospheric pressure conditions or may occur at elevated temperatures and/or elevated pressures. The resulting material has a modified surface chemistry. An example of a type of modified chemistry is the replacement less stable hydrogen bonds with more stable fluorine bonds. (This is the same process described in 2a with the exception that in 2a, the material is the uncured prepreg. In the method described here, the material has already been cured). An example of this is the fluorination process by Fluorodynamics in which cured graphite-epoxy was subjected to a mixture of fluorine in $GN_2$ at a slightly elevated temperatures in an oven for a predetermined amount of time.

MANUFACTURING DETAIL EXAMPLES

A halogenated composite tank or feedline can be fabricated using either of the uncured composite systems, any appropriate placement method, and any curing process. A listing of each of these systems, placement methods, and curing methods is found below. The best system to use depends on a variety of factors. including, but not limited to, tank size and shape, composite material used, and available resources. Therefore, a decision on the best fabrication process must be made on a case-related basis.

A) Composite Tanks from Halogenated Prepregs or Resins

Uncured Composite Systems:

Prepreg Systems (as described in Material Details, Section 2)

Wet Systems (as described in Material Details, Section 1)

A prepreg consists of reinforcement, such as graphite, glass, or Kevlar®, which is impregnated with a resin, in this case with a halogenated. An example of a halogenated prepreg is fiber impregnated with any of HexcelÔs F155 resin series. Another example of a cyanate ester prepreg is fiber impregnated with BryteÔs 1522 resin series. In both examples, the fiber was an intermediate modulus, high strength graphite, such as IM7. Also, in either example the fiber may be either uni-directional tape, slit tape, tow, fabric, chopped fiber, or felt.

A wet process involves working with a neat resin and dry fiber reinforcement. The dry reinforcement may be graphite, glass, or Kevlar. Any dry reinforcement may be in the form of woven fabric, unidirectional, chopped fiber, or felt.

Placement Methods for Prepreg Systems (as described in Material Details, Section 2).

Fiber Placement

Tape Placement

Filament Winding

Hand Lay-up

Fiber placement is an automated process where a robotic arm with a dispensing head is used to place several pieces of prepreg tow or slit tape, typically approximately 0.125 inches wide by 0.0055 inches thick, onto a mandrel in a desired orientation. Tape placement is a similar automated process, but the placement head is attached to a gantry rather than a robotic arm, and it places prepreg tape, typically 12 or 14 inches wide, onto the tool or mandrel. Filament winding is a process in which continuous prepreg tow is wound onto a rotating mandrel in a prescribed way. Hand lay-up is when prepreg, usually tape or fabric, is manually applied to a tool or mandrel.

Placement Methods for Wet Systems (as described in Material Details, Section 1):

Vacuum Assisted Resin Transfer Molding (VARTM) or Resin Infiltration (RI)

Filament Winding

Hand Lay-up

VARTM and RI are processes where vacuum pressure is used to force wet resin into dry reinforcement, typically fabric, which is previously placed on the tool or mandrel. Filament winding is the same as above, only a dry tow is run through a resin bath prior to placement on the tank rather than using prepreg tow. H and lay-up is where resin is manually applied to dry reinforcement either before or after placing on the tool or mandrel.

Curing Processes:

Autoclave

Oven Cured (with or without vacuum bag)

Radiation Cure (such as electron beam)

Figure 1:
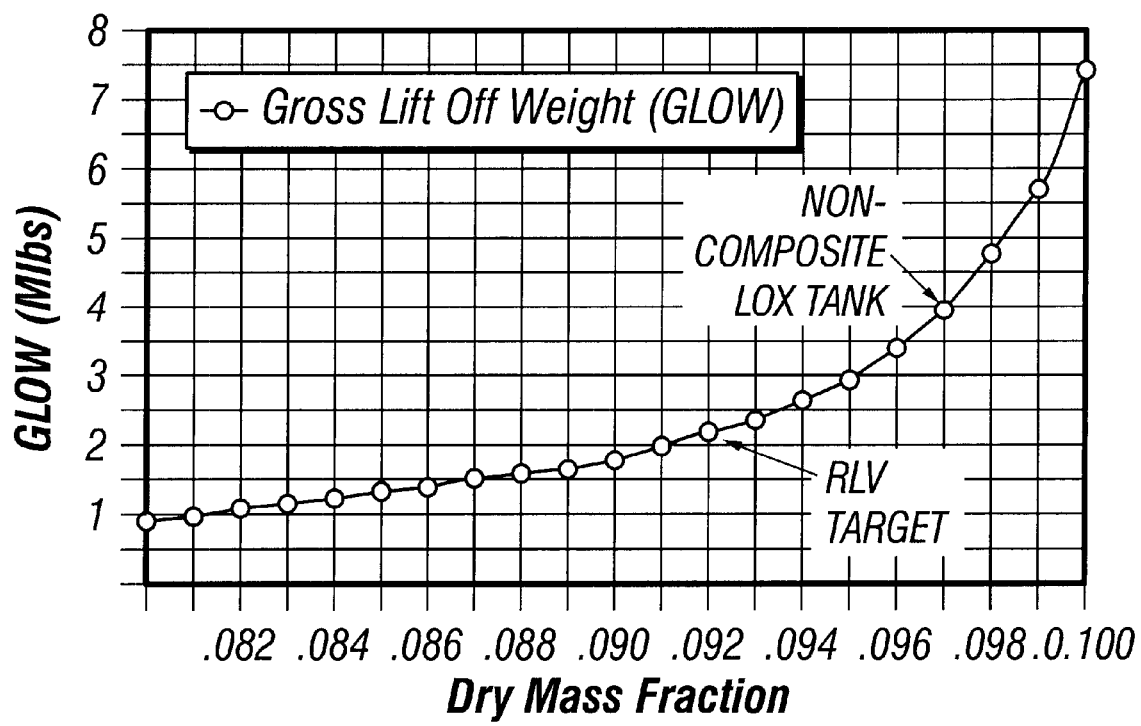
FIG. 1 is a graphical representation of the effect of mass fraction on gross lift off weight.
Figure 2:
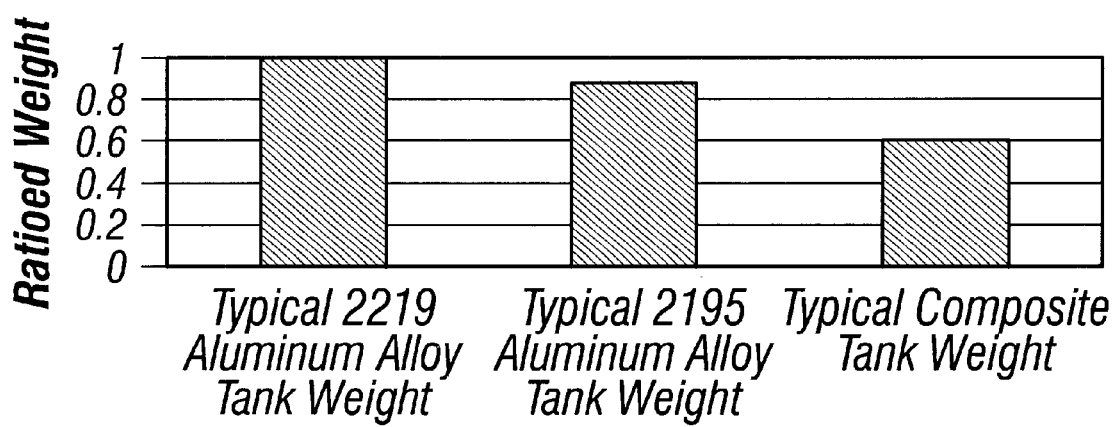
FIG. 2 is a graphical representation of material weight comparison.
Figure 3:
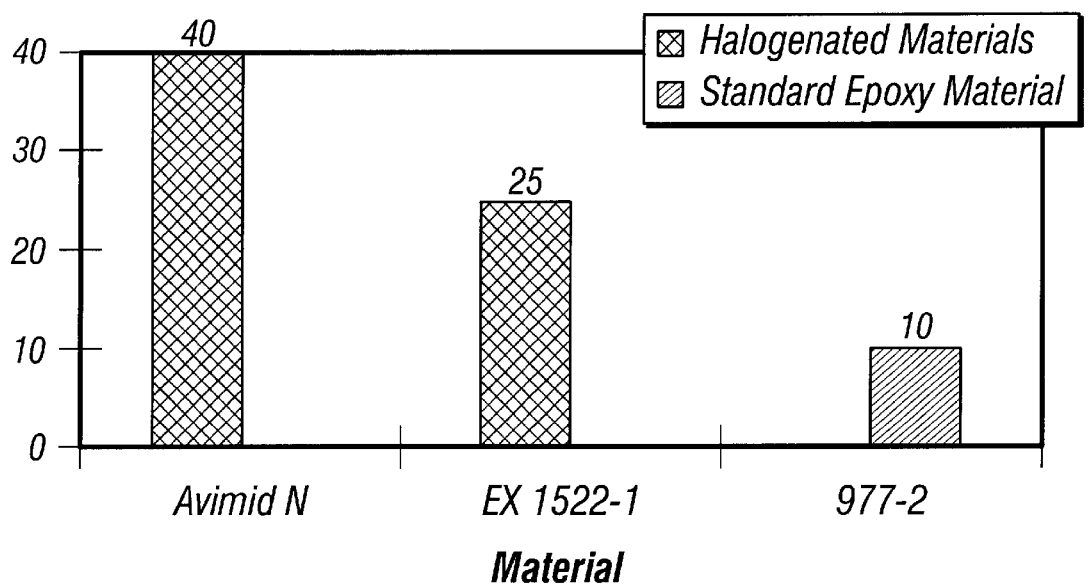
FIG. 3 is a graphical representation of resin mechanical impact thresholds.
Figure 4:
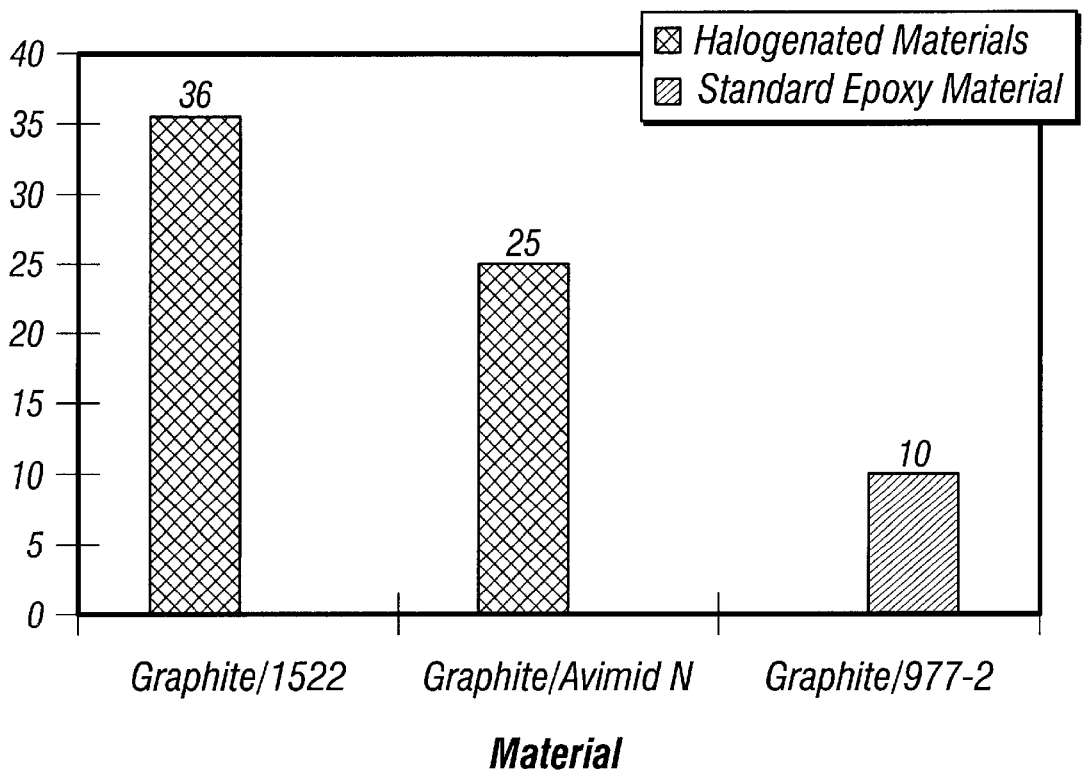
FIG. 4 is a graphical representation of graphite reinforced composite mechanical impact thresholds.
Figure 5:
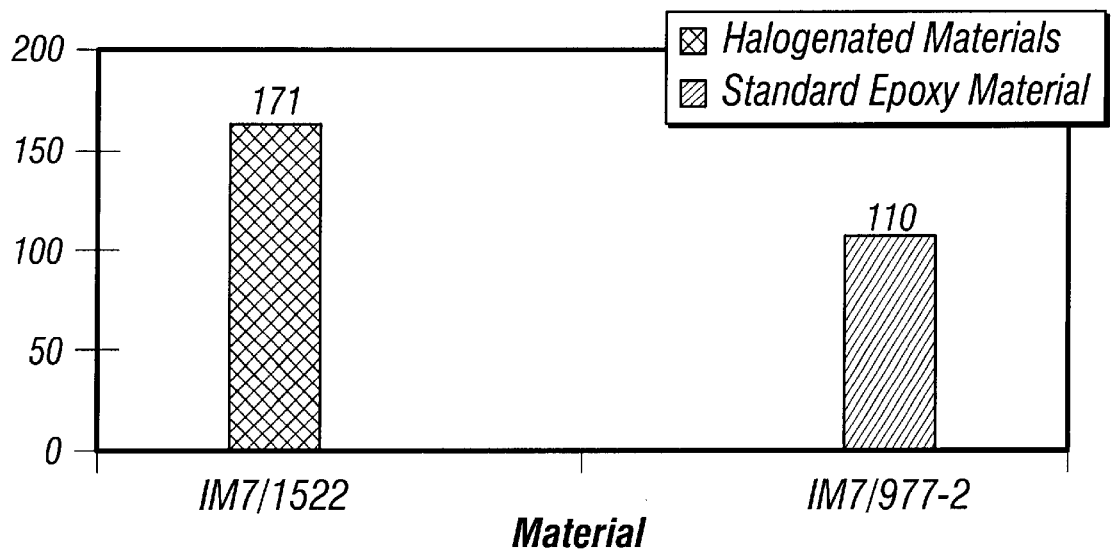
FIG. 5 is a graphical representation of average complete burn times.
Figure 7:
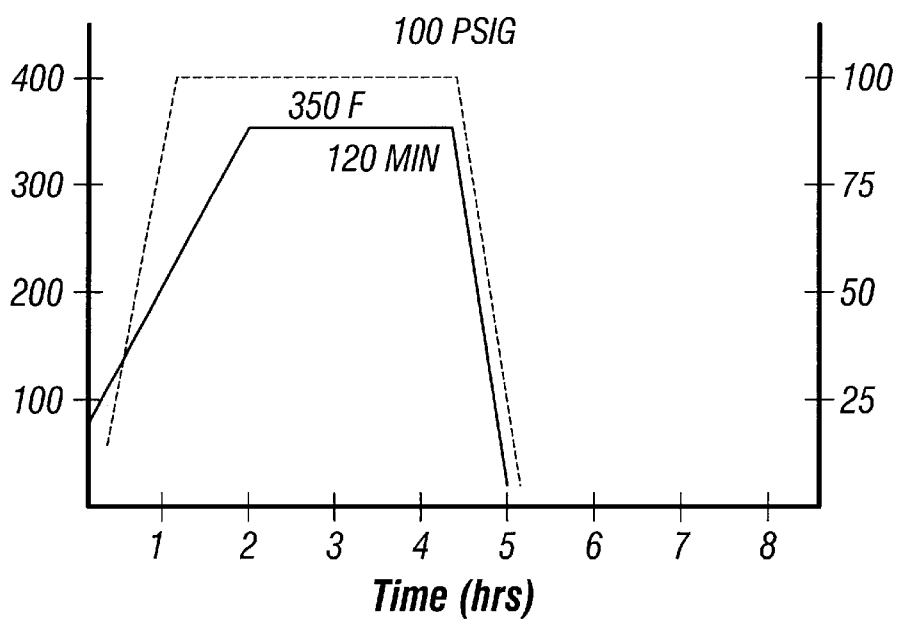
FIG. 7 is a graphical representation showing halogenated prepreg cure cycle.
Figure 7:
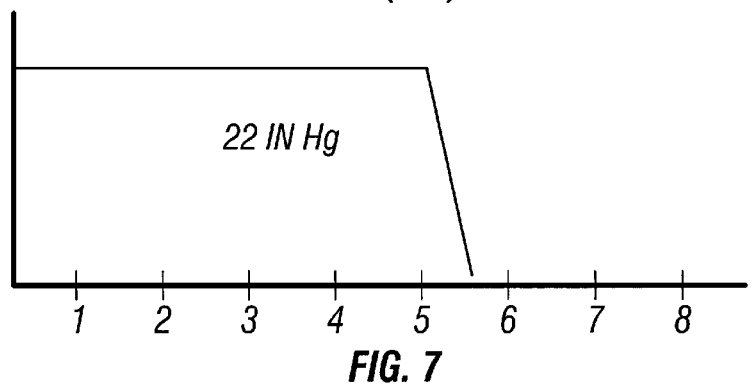
Figure 6:
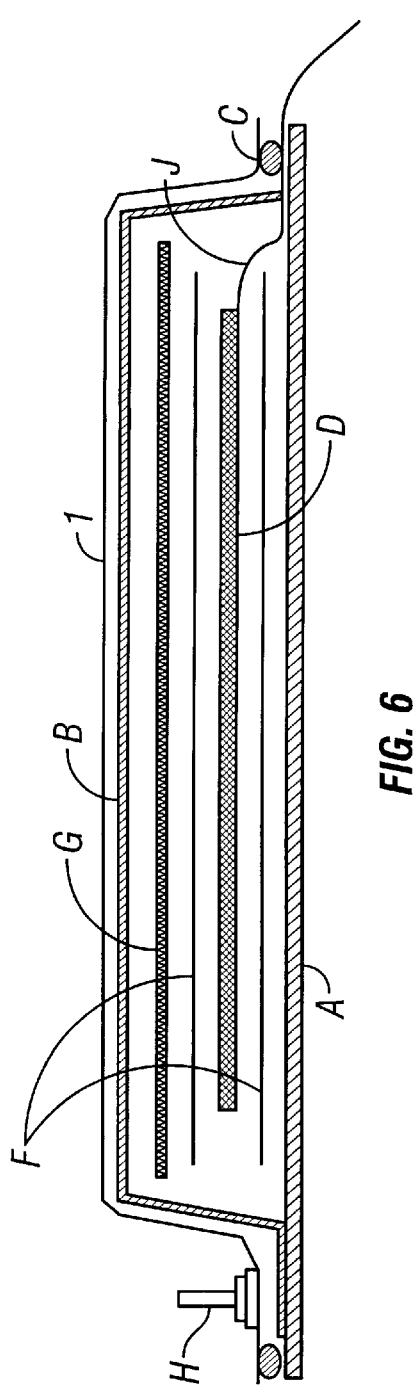
FIG. 6 is a schematic diagram of a halogenated prepreg autoclave vacuum bag.

Curing of a composite material is the application of energy (heat or radiation) and possibly pressure to cause a chemical reaction and form a compact, solid part. The cure method may be any of the following: autoclave (elevated temperature and pressure)s vacuum-bag oven cure (elevated temperature and vacuum pressure), oven cure (elevated temperature, ambient pressure), or radiation cure (typically ambient temperature and pressure with radiation, such as electron beams or x-ray radiation). FIG. 6 and FIG. 7 illustrate an example of a bagging scheme and autoclave cure, respectively, for a halogenated (brominated) epoxy prepreg.

B) Halogen Treatment of Composite Materials (as described in Material Details Section 3)

An oxygen compatible tank can be made by taking a cured tank made from a non-halogenated material using an appropriate system, placement technique, and curing technique described in Section A of the Manufacturing Details above. A halogenation treatment process is then performed on the cured tank.

The following listing describes parts shown in FIG. 6.

A) BASE PLATE: Aluminum, ⅝" thick with no deep scratches or pits. (if surface is damaged, a thin caul plate must be used to provide a smooth tool surface)

B) BREATHIER: Airtech Super 10 or Ultraweave 1032
C) SEALANT TAPE: Schnee-Moorehead 5626 or Airtech GS-213
D) LAMINATE: Lay-up Orientation; example [0,45,90,-45]$_{2s}$,
F) RELEASE FILM: Airtech. A4000R Release Film, (1 mil)
G) CAUL SHEET: Torr, EL82, 50 DURO, 48" width, 0.063" Thk.
H) VACUUM COUPLING: 2 required, 1 source & 1 transducer. Minimum of two plies of breather under couplings.
I) VACUUM BAG: Airtech, DP1000 SHTG, 2 mil
J) THERMOCOUPLE: 2 required, opposite edges of laminate, mid ply.
1) Apply vacuum (22 in Hg min TIME (hrs)

2) Heat at 5° F./min to 350° F. Lagging T/C must maintain 3° F./min minimum.
4) Apply 100 psi pressure to laminate.
7) Hold at 350° F. (−5/+10° F.) for 120 minutes.
8) Cool at −5° F./min.
9) Maintain pressure until the temperature falls below 150° F.

NOTES: This cure cycle may be modified as follows:
1. Additional holds may be specified by manufacturing engineering (ME) if the lagging thermocouple falls 15° F. behind leading thermocouple. Intermediate holds are to be implemented to allow lagging thermocouples to reach within 5° F. of leading. The intermediate holds for the leading thermocouple should be limited to 180° F., 225° F. and/or 315° F.
2) ME may specify hot and/or cold debulks to ensure good ply consolidation or to protect the part between shifts.
3) ME may specify a maximum of 10 psi at the beginning of the cure cycle to improve heat transfer in the autoclave.
4) ME may specify alternative peel plies to promote adhesion in future bond areas that may require additional strength.

PARTS LIST:

| | |
|---|---|
| 10 | tank apparatus |
| 11 | cylindrical sidewall |
| 12 | frusto-conical end |
| 13 | frusto-conical end |
| 14 | lobe |
| 15 | lobe |
| 16 | support beam |
| 17 | support beam |
| 18 | support beam |
| 19 | support beam |
| 20 | support beam |
| 21 | support beam |
| 22 | support beam |
| 23 | support beam |
| 24 | spherical tank |
| 25 | ogived tank |
| 26 | lifting body |
| 27 | winged body |
| 28 | cylindrical stage |
| 29 | multi-lobe tank |

-continued

| | |
|---|---|
| 30 | conformed tank |
| 31 | inner surface |
| 32 | wall |
| 33 | feedline |

The following is a list of parts and materials suitable for use in the present invention:

| Material | Generic Description | Trademark | Supplier |
|---|---|---|---|
| prepreg | graphite fiber-reinforced halogenated epoxy resin | Reinforcement fiber, which is further defined in a subsequent row, which is impregnated with a halogenated resin such as 1522, 1522-1 or any modified version of these (the 1522 family is a blend of epoxy-cyanate ester-bromine) | Bryte |
| prepreg | graphite fiber-reinforced halogenated epoxy resin | Reinforcement fiber, which is further defined in a subsequent row, impregnated with F155 resin | Hexcel |
| fiber | intermediate modulus, high strength graphite, which may be uni-directional tape, slit tape, tow, fabric, woven fabric, chopped fiber, or felt | Examples: IM7, IM6, IM2; Note: Prefered is IM7 | Hexcel |
| fiber | intermediate modulus, high strength graphite, which may be uni-directional tape, slit tape, fabric, tow, woven fabric, chopped fiber, or felt | Examples: T650, T800, T300 | Amoco |
| fiber | high modulus, intermediate strength graphite (uni-directional tape, slit tape, tow, fabric, woven fabric, chopped fiber, or felt) | Example: M55J | Hexcel |
| fiber | glass (E, S, or C type) | Fiberglas ® | Owen/Corning |
| fiber | Aramid | Kevlar ® | Hexcel |
| resin | halogenated epoxy | F155 resin (in which the halogen is Bromine) | Hexcel |
| resin | halogenated cyanate ester | EX 1522-1 (in which the halogen is Bromine) | Bryte |
| resin | halogenated thermoplastic (may be considered a pseudothermosetting one) | Avimid N (in which case the halogen is Fluorine); this material is supplied as a prepreg | Cytec Fiberite (formerly from DuPont) |
| resin | halogenated epoxy, wet resin | Examples: EPON 1162, 1183 (both of these have Bromine as a halogen) | Shell |

An alternate embodiment of the present invention can include an apparatus for transporting LOX comprising a composite feedline having means for transporting LOX, the feedline having an interior for transporting a cryogenic material that has a temperature as low as around minus 300 degrees F., the feedline having a feedline wall with an inner surface for contacting LOX, the feedline wall having a composite construction that includes a fiber-reinforced resin portion made of fiber-reinforced halogenated resin.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A liquid oxygen tank apparatus comprising:
   a) a tank body having an unlined wall with inner and outer surfaces, the inner surface defining a hollow interior for containing liquid oxygen;
   b) the tank wall and inner surface each comprising a composite construction that includes a fiber reinforced halogenated epoxy resin.

2. The liquid oxygen tank apparatus of claim 1 wherein the halogenated resin is brominated.

3. The liquid oxygen tank apparatus of claim 1 wherein the halogenated resin is fluorinated.

4. The liquid oxygen tank apparatus of claim 1 wherein the tank body has a mechanical impact threshold that is at least 10 foot pounds.

5. The liquid oxygen tank apparatus of claim 1 wherein the tank body has a mechanical impact threshold that is at least 25 foot pounds.

6. The liquid oxygen tank apparatus of claim 1 wherein the tank body has a mechanical impact threshold that is at least 36 foot pounds.

7. The liquid oxygen tank apparatus of claim 1 wherein the tank body has a mechanical impact threshold that is at least 72 foot pounds.

8. A method of using a composite tank to hold LOX, comprising:
   providing a composite tank apparatus, the composite tank apparatus comprising a structural tank body having an interior surrounded by an inner surface portion for containing a cryogenic material that has a temperature as low as around minus 300 degrees F., the tank body having a tank wall with an inner surface for contacting LOX, the tank wall and inner surface portion each having a composite construction that includes a fiber-reinforced halogenated epoxy resin portion; and
   putting LOX in the composite tank apparatus.

9. The method of claim 8, wherein the fiber-reinforced resin portion directly contacts LOX when LOX is put into the composite tank apparatus.

10. The method of claim 8, wherein the fiber-reinforced resin portion is made of fiber-reinforced halogenated resin.

11. Apparatus for holding LOX comprising:
    a structural tank body having unlined wall surrounding an interior for containing a cryogenic material that has a temperature as low as around minus 300 degrees F., the tank body having a tank wall with an inner surface for contacting LOX, the tank wall and inner surface each having a composite construction that includes a fiber-reinforced resin portion made of fiber-reinforced halogenated epoxy resin.

12. The apparatus of claim 11, wherein the fiber-reinforced resin portion directly contacts LOX when LOX is put into the composite tank apparatus.

13. The invention of claim 11, the fiber-reinforced resin has an average complete burn time of at least around 171 seconds.

14. The invention of claim 11, wherein the halogenated resin is halogenated cyanate ester.

15. The apparatus of claim 11, wherein the halogenated resin is brominated.

16. Apparatus for transporting LOX comprising:
    a composite feedline having means for transporting LOX, the feedline having an interior for transporting a cryogenic material that has a temperature as low as around minus 300 degrees F., the feedline having a feedline wall with an inner surface for contacting LOX, the feedline wall and inner surface having a composite construction that includes a fiber-reinforced resin portion made of fiber-reinforced halogenated resin.

17. The apparatus of claim 16, wherein the fiber-reinforced resin portion directly contacts LOX when LOX is put into the apparatus.

18. A launch vehicle comprising:
    a) an air frame;
    b) an engine;
    c) liquid oxygen for fueling the engine;
    d.) a tank for containing said liquid oxygen, the tank comprising:
       i) a tank body having an unlined wall with inner and outer surfaces, the inner surface defining a hollow interior for containing liquid oxygen;
       ii) the tank wall and inner surface each comprising a composite construction that includes a fiber reinforced halogenated epoxy resin.

19. The launch vehicle of claim 18, wherein the tank is spherical in shape.

20. The launch vehicle of claim 18 wherein the tank is conformal in shape.

21. A launch vehicle comprising:
    a) an air frame;
    b) an engine;
    c) liquid oxygen for fueling the engine;
    d) a tank for containing said liquid oxygen, the tank comprising:
       i) a tank body having a wall with inner and outer surfaces, the inner surface defining a hollow interior for containing liquid oxygen;
       ii) the tank wall comprising a composite construction that includes a fiber reinforced halogenated epoxy resin wherein the tank is a multi-lobe tank.

* * * * *